Aug. 24, 1965

A. SCHMERMUND 3,202,266

CONVEYOR BELTS

Filed April 12, 1962

INVENTOR:
ALFRED SCHMERMUND
BY: NOLTE AND NOLTE
ATTORNEYS

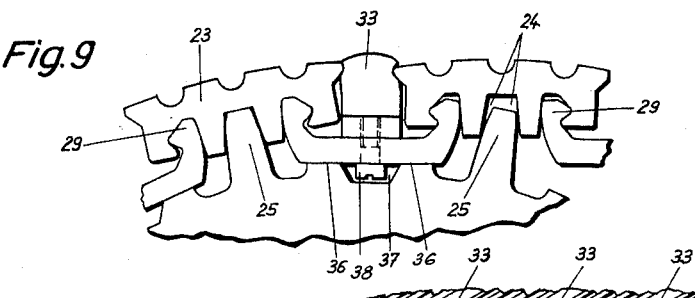
Fig. 9
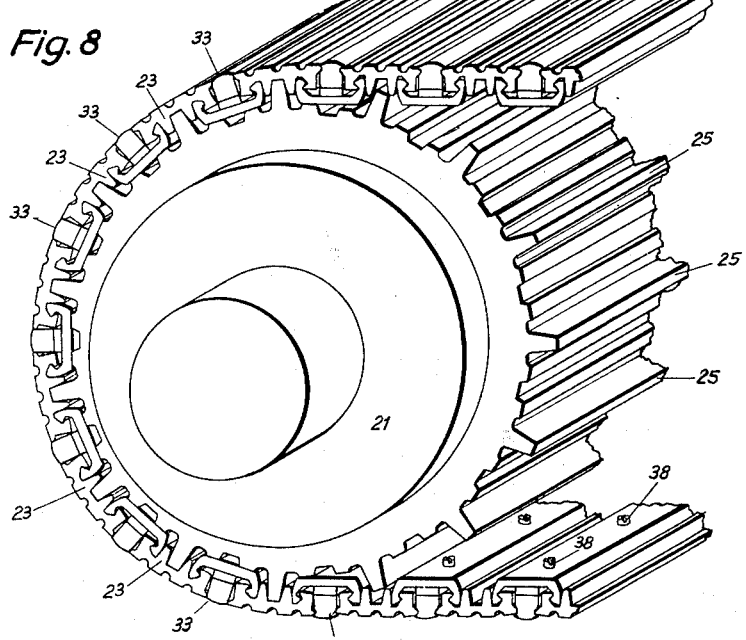
Fig. 8
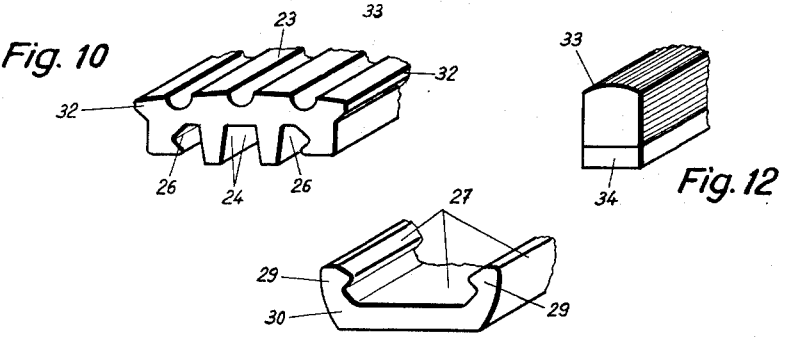
Fig. 10
Fig. 11
Fig. 12

Aug. 24, 1965 A. SCHMERMUND 3,202,266
CONVEYOR BELTS
Filed April 12, 1962 3 Sheets-Sheet 3

INVENTOR:
ALFRED SCHMERMUND
By: NOLTE AND NOLTE
ATTORNEYS

United States Patent Office 3,202,266
Patented Aug. 24, 1965

3,202,266
CONVEYOR BELTS
Alfred Schmermund, 62 Kornerstrasse, Gevelsberg,
Westphalia, Germany
Filed Apr. 12, 1962, Ser. No. 187,077
Claims priority, application Germany, Apr. 20, 1961,
Sch 29,581
7 Claims. (Cl. 198—195)

The invention relates to articulated conveyor belts, and more specifically to conveyor belts for pressing tobacco into a cake while conveying the tobacco to a tobacco cutting arrangement. Tobacco cutting arrangements are usually fed with tobacco by two converging pressing conveyor belts. The pressing forces are considerable and it has been proposed to form the conveyor belts from plate-like outer articulation links which form the operative surface of the belt, the outer links being pivotally connected into a chain by inner articulation links which pivotally engage the outer articulation links, both the outer and inner articulation links having cross sectional configurations enabling them to withstand the pressing forces.

In order to prevent tobacco particles from passing into spaces between the individual articulation links, it has been proposed to form the outer articulation links in such a manner that longitudinal edges of adjacent outer articulation links overlap each other in such a manner that contact is maintained between them both when the conveyor belt is curved, for example when passing over a sprocket, and when the belt is straight. It has also been proposed to form the longitudinal side edges of the outer articulation links concentric to pivoting axes of the outer articulation links on the inner articulation links and to dimension the outer articulation links so that the longitudinal side edges of adjacent outer articulation links contact each other, both when the belt is curved and when the belt is straight.

It has been found that with these previously proposed articulated conveyor belts, after a period of use, tobacco particles nevertheless penetrate between the outer articulation links, impairing the flexibility of the belt by forming incrustations on the outer articulation links and at the regions of pivotal connection of the outer and inner articulation links, and making frequent cleaning of the belt necessary.

It is an object of the present invention to provide an articulated conveyor belt which, when used in combination with a tobacco cutting arrangement, prevents tobacco particles from impairing the flexibility of the conveyor belt.

It is another object of the invention to provide an articulated conveyor belt which enables material such as tobacco or tea to be conveyed thereon without substantial loss of tobacco particles, tea particles or other particles of the material conveyed.

It is a further object to provide an articulated conveyor belt which is of simple construction and yet reliable in use.

These and other objects and advantages of the invention will become apparent to those skilled in the art from the following detailed description of some embodiments of the invention when read in conjunction with the appended drawings, which are given by way of example and in which:

FIG. 8 is a perspective view, partly broken away, of another articulated conveyor belt, arranged on another sprocket;

FIG. 9 is an enlarged view of part of the belt and sprocket of FIG. 8;

FIG. 10 is a perspective view, partly broken away, of an outer articulation link of the belt of FIG. 8;

FIG. 11 is a perspective view, partly broken away, of an inner articulation link of the belt of FIG. 8;

FIG. 12 is a perspective view, partly broken away, of a filler strip of the belt of FIG. 8;

Figure 2:
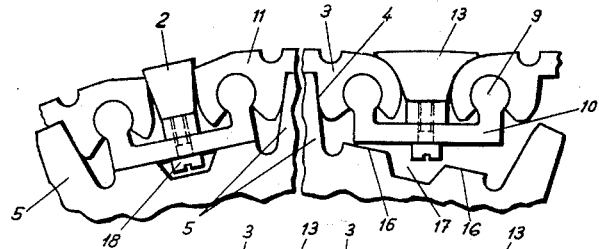
FIG. 2 is an enlarged view of part of both of the embodiments of the belt and sprocket of FIG. 1.
Figure 1:
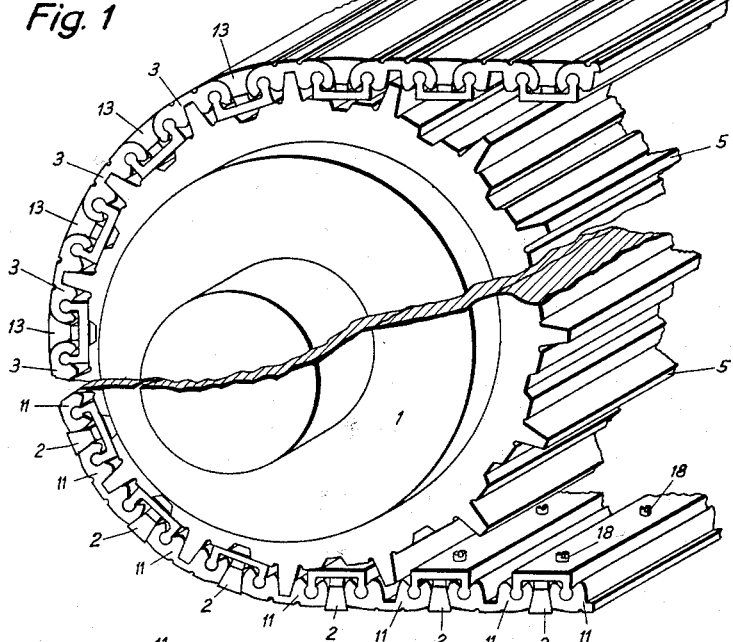
FIG. 1 is a perspective view, partly broken away, of an articulated conveyor belt arranged on a sprocket, and is a composite view showing two different embodiments of the belt.
Figure 3:
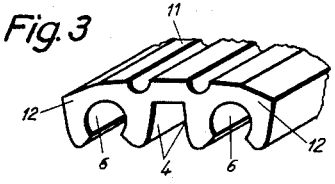
FIG. 3 is a perspective view, partly broken away, of an outer articulation link of one of the embodiments of the belt.
Figure 4:
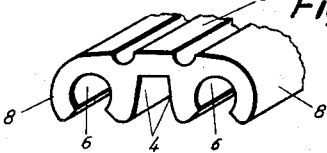
FIG. 4 is a perspective view, partly broken away, of an outer articulation link of the other embodiment of the belt.
Figure 5:
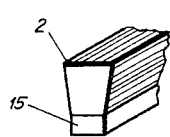
FIG. 5 is a perspective view, partly broken away of a filler strip for use with the link of FIG. 3.
Figure 6:
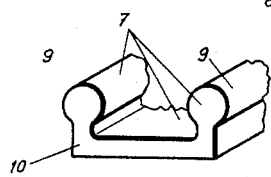
FIG. 6 is a perspective view, partly broken away, of an inner articulation link of either embodiment of the belt.
Figure 7:
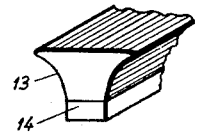
FIG. 7 is a perspective view, partly broken away, of a filler strip for use with the link of FIG. 4.

In FIGS. 1 to 7 two embodiments of an articulated conveyor belt for the pressing and conveying of tobacco are illustrated. In FIG. 1 a sprocket 1 is shown which serves for driving or supporting the belt. The belt is formed from outer articulation links 3 or 11 which are pivotally connected in chain-like form by inner articulation links 7, the connection being effected by engagement of cylindrical projections 9 of the links 7 in cylindrical recesses 6 of the links 3 or 11. The longitudinal edges of adjacent outer articulation links 3 or 11 are spaced apart from each other, a filler strip 13 or 2, respectively, being provided in the space between each two adjacent outer links. The filler strips 2 or 13 (see FIGS. 5 and 7) are made of resilient solid material and are mounted by vulcanising, cementing or screwing, on metal bars 15 or 14 respectively, these serving for attaching the filler strips to the inner articulation links, as shown in FIG. 2 by means of screws 18.

In the embodiment shown in the left hand part of FIG. 2, each filler strip 2 is engaged by angular longitudinal edges 12 of the adjacent outer articulation links 11 (see also FIG. 3), whereas in the embodiment shown in the right hand part of FIG. 2, the filler strip 13 is engaged by curved longitudinal edges 8 of the adjacent outer articulation links 3, so that hermetic sealing of the operative surface of the conveyor band is possible. The sealing action of the filler strips 13 increases as increased pressure is exerted thereon by tobacco being pressed and fed.

In the embodiment, shown in the left hand part of FIG. 2, the angular edges 12 of the outer articulation links 11 cause a sealing action to take place when they press onto the filler strips 2. In such a case, when the belt moves in a curved path over the sprocket 1 sliding does not take place between the filler strips 2 and the outer articulation links 11 (see left-hand side of FIG. 2). When the belt is moving over the sprocket 1, the angular edges 12 exert only slight pressure on the filler strips 2. Along the operative span of the belt however, where the belt is essentially straight, the angular edges 12 forcibly press on the filler strips, and in the return span of the belt the resilient action of the filler strips 2 has an advantageous automatic belt tensioning effect.

The sprocket 1 has teeth 5 adapted to engage in grooves 4 formed in the outer articulation links 3 or 11 for driving the belt. Between the teeth 5, supporting surfaces 16 are provided for the inner articulation links 7, the surfaces 16 forming supports for portions 10 of the links 7, which interconnect the cylindrical projections 9 thereof. The teeth 5 are of involute form and are separated by grooves 17 (see FIG. 2) adapted to receive the heads of the screws 18.

In the embodiment of FIGS. 8 to 12, outer articulation links 23 are provided which are interconnected by inner articulation links 27. The actual pivotal connections between the links 23 and 27 are effected by engagement of "knife-edged" projections 29 of the links 27 in notched grooves 26 of the links 23. Sealing between adjacent links 23 is effected by filler strips 33 of resilient solid material which are vulcanised to metal bars 34 (see FIGS. 9, 10 and 12) and connected by these bars 34 to the inner links 27 by means of screws 38, so as to lie between longitudinal edges 32 of the links 23. The edges 32 of the links 23 press against the filler strips 33 and thus effect a sealing of the operative surface of the band.

The sprocket 21 shown in FIGS. 8 and 9 has teeth 25 for engaging grooves 24 formed in the links 23. Adjacent the teeth 25, supporting surfaces 36 are provided for engagement by portions 30 of the links 27, the portions 30 interconnecting the projections 29 thereof. Between the teeth 25, the sprocket 21 has grooves 37 which provide clearance for the heads of the screws 38.

Figure 13:
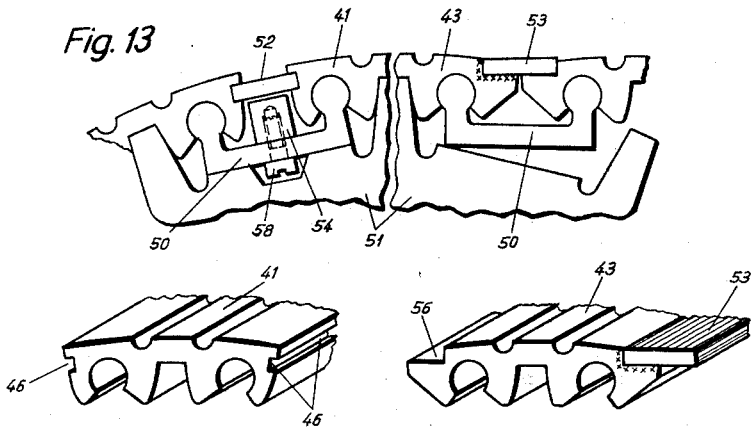
FIG. 13 is a view, similar to FIG. 2, illustrating two further arrangements of filler strips.
Figure 14:
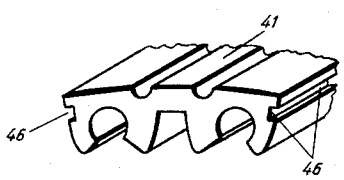
FIG. 14 is a perspective view, partly broken away, of an outer articulation link of the kind shown in the left hand part of FIG. 13.
Figure 17:
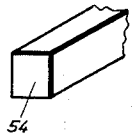
FIG. 17 is a perspective view, partly broken away, of a support bar such as is shown in the left hand part of FIG. 13.

In the embodiment shown in the left hand part of FIG. 13, an outer articulation link 41 has lateral grooves 46 (see FIG. 14) in which filler strips 52 of rubber or synthetic plastic are provided, the filler strips extending between the grooves 46 in adjacent links 41 and being supported by supporting bars 54 (see also FIG. 17) secured to the inner articulation links 50 by screws 58.

Figure 15:
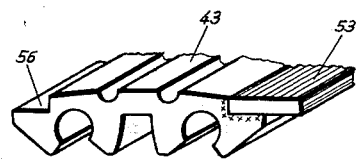
FIG. 15 is a perspective view, partly broken away, of an outer articulation link of the kind shown in the right hand part of FIG. 13.
Figure 16:
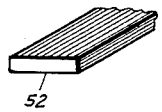
FIG. 16 is a perspective view, partly broken away, of a filler strip such as is shown in the left hand part of FIG. 13.

In the embodiment shown in the right hand part of FIG. 13, an outer articulation link 43 has recesses 56 (see FIG. 15). A resilient filler strip 53 is applied to one of the recesses 56 of each link 43 and serves for bridging the space between adjacent links 43 by engaging the adjacent recess 56 of the adjacent link 43. The filler strip 53 may be vulcanised, cemented or screwed in the said one recess 56 and may also be vulcanised, cemented or screwed in the recess of the adjacent link 43 which it engages.

Figure 18:
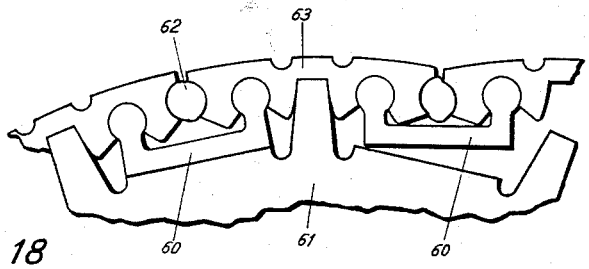
FIG. 18 is a fragmentary view of an articulated conveyor belt and a sprocket, showing another arrangement of a filler strip.
Figure 19:
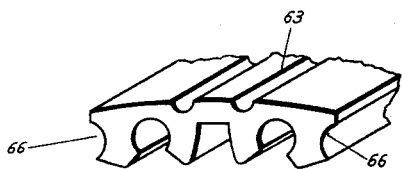
FIG. 19 is a perspective view, partly broken away, of an outer articulation link of the belt of FIG. 18.
Figure 20:
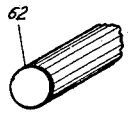
FIG. 20 is a perspective view, partly broken away, of a filler strip of the belt of FIG. 18.

In the embodiment of FIG. 18, outer articulation links 63 have cylindrically curved grooves 66 in their adjacent longitudinal edges (see also FIG. 19). The outer articulation links 63 are pivotally connected together by inner articulation links 60 and the belt so formed is carried by a sprocket 61. The grooves 66 of adjacent links 63 form cylindrical channels in which cylindrical filler strips 62 of rubber or synthetic plastic are inserted (see also FIG. 20). The cylindrical channels are not completely closed, so that gaps exist above and below the filler strips between adjacent links 63. When the conveyor belt leaves the sprocket 61 and is thus straightened out, the parts of the links 63 defining the grooves 66 press against the filler strips 62 causing a deformation thereof as shown in the right hand part of FIG. 18, resulting in hermetic sealing of the operative surface of the belt.

It should be clearly understood that the embodiments hereinbefore described with reference to the appended drawings are given by way of example only. In fact, further modifications, additions and omissions are possible without departing from the scope of the invention.

I claim:

1. An articulated conveyor belt for compressing and feeding tobacco, tea and other material, comprising a plurality of plate-like outer articulation links, side edges on said outer links, sharp corners projecting from said side edges, a plurality of inner articulation links pivotally engaging said outer links so that side edges of succeeding outer links lie adjacent one to the next with a space therebetween, and solid, resilient filler strips provided in said spaces between said sharp corners of adjacent side edges and being arranged so that said corners bite into said filler strips at least where the belt travels along a plane surface, whereby to seal said spaces.

2. A conveyor belt as defined in claim 1, and further comprising supporting bars secured to said inner links, and fixed to said filler strips.

3. A conveyor belt as defined in claim 1, wherein adjacent side edges have recesses facing each other, portions of said filler strips being accommodated in and held by said recesses, said corners bordering said recesses.

4. An articulated conveyor belt for compressing and feeding tobacco, tea and other material, comprising a plurality of plate-like outer articulation links, side edges on said outer links, said side edges having recesses facing each other, a plurality of inner articulation links pivotally engaging said outer links so that side edges of succeeding outer links lie adjacent one to the next with a space therebetween, and solid, resilient flat longitudinal filler strips provided in said spaces, marginal portions of said filler strips being accommodated in and held by said recesses and being arranged so that said filler strips seal said spaces at least where the belt travels along a plane surface.

5. A conveyor belt as defined in claim 4, and further comprising longitudinal bars attached to said inner links and so arranged that a surface of each bar faces an adjacent surface of one of said filler strips.

6. A conveyor belt as defined in claim 4, and further comprising ledges on said side edges, said ledges supporting said filler strips and forming part of the boundaries defining said recesses.

7. An articulated conveyor belt for compressing and feeding tobacco, tea and other material, comprising a plurality of plate-like outer articulation links, rounded side edges on said outer links, a plurality of inner articulation links pivotally engaging said outer links so that side edges of succeeding outer links lie adjacent one to the next with a space therebetween, solid, resilient filler strips in said spaces, said filler strips being rounded complementarily to said rounded side edges to be able to press tightly against said side edges and thereby to seal said spaces, and bars secured to said inner links and fixed to said filler strips.

References Cited by the Examiner

UNITED STATES PATENTS

| 1,190,921 | 7/16 | Leoni | 198—184 X |
| 1,224,993 | 5/17 | Anderson | 198—193 |
| 1,486,582 | 3/24 | House | 74—235 |

FOREIGN PATENTS

| 827,176 | 1/52 | Germany. |
| 663,106 | 12/51 | Great Britain. |

OTHER REFERENCES

Körber: German Application 1,099,920, printed Feb. 16, 1961 (III/79a).

SAMUEL F. COLEMAN, *Primary Examiner.*

WILLIAM B. LA BORDE, *Examiner.*